(12) United States Patent
Yokum et al.

(10) Patent No.: US 12,538,404 B2
(45) Date of Patent: Jan. 27, 2026

(54) DYNAMIC THRESHOLDING FOR AMBIENT LIGHT-BASED LOAD CONTROL (71) Applicant: Leviton Manufacturing Co., Inc., Melville, NY (US)

(72) Inventors: Brian Anthony Yokum, New Orleans, LA (US); Ronald James Gumina, Mandeville, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 57 days.

(21) Appl. No.: 18/736,920

(22) Filed: Jun. 7, 2024

(65) Prior Publication Data
US 2025/0056696 A1    Feb. 13, 2025

Related U.S. Application Data (60) Provisional application No. 63/518,542, filed on Aug. 9, 2023.

(51) Int. Cl.
H05B 47/11    (2020.01)
(52) U.S. Cl.
CPC .................................. H05B 47/11 (2020.01)
(58) Field of Classification Search
CPC ...................................................... H05B 47/11
See application file for complete search history.

(56) References Cited

U.S. PATENT DOCUMENTS

| | | | |
|---|---|---|---|
| 7,608,807 B2 | 10/2009 | Hick et al. | |
| 8,461,503 B2 | 6/2013 | Leinen | |
| 9,370,080 B2 | 6/2016 | Leinen | |
| 9,648,697 B1 | 5/2017 | Hick | |
| 10,492,275 B2 | 11/2019 | Leinen et al. | |
| 10,512,138 B1* | 12/2019 | Joseph | H05B 47/19 |
| 10,770,028 B2* | 9/2020 | Mese | G09G 5/10 |
| 11,163,162 B2* | 11/2021 | Takagi | G02B 27/0172 |
| 12,205,316 B2* | 1/2025 | Suzuki | G06T 5/70 |
| 12,231,777 B2* | 2/2025 | Gao | H04N 23/684 |
| 2005/0051708 A1* | 3/2005 | Hotelling | G01J 1/00 250/214 AL |
| 2009/0289175 A1* | 11/2009 | Mahowald | G06F 1/3203 250/216 |
| 2012/0268019 A1 | 10/2012 | Briggs et al. | |
| 2012/0313535 A1* | 12/2012 | Bedell | H05B 47/13 315/158 |
| 2013/0147368 A1* | 6/2013 | McCavit | H05B 47/11 315/159 |
| 2013/0293113 A1 | 11/2013 | Morrow | |

(Continued)

Primary Examiner — Adam D Houston
(74) Attorney, Agent, or Firm — Matthew M. Hulihan; Heslin Rothenberg Farley & Mesiti P.C.

(57) ABSTRACT

Approaches for controlling supply of power to a load in an environment based on ambient light sensing and dynamic thresholding include, based on an ambient light level in the environment decreasing to a turn-on threshold light level, controlling a switch of an electrical load controller to couple the supply of electrical power to the lighting load, sensing a current ambient light level in the environment after lapse of a predetermined amount of time subsequent to controlling the switch to couple the supply of electrical power to the lighting load, and adjusting a turn-off threshold light level using the current ambient light level.

25 Claims, 7 Drawing Sheets (56) References Cited

U.S. PATENT DOCUMENTS

| | | | |
|---|---|---|---|
| 2013/0328842 A1* | 12/2013 | Barnhoefer | G06F 3/0443 |
| | | | 345/207 |
| 2014/0028197 A1* | 1/2014 | van de Ven | H05B 45/22 |
| | | | 315/153 |
| 2015/0342001 A1 | 11/2015 | Lunn et al. | |
| 2016/0073475 A1 | 3/2016 | Klein Swormink et al. | |
| 2018/0301114 A1* | 10/2018 | Mese | G09G 5/10 |
| 2020/0367340 A1* | 11/2020 | Bartle | H05B 47/11 |
| 2021/0267038 A1 | 8/2021 | Bedell et al. | |
| 2022/0255344 A1 | 8/2022 | Walsh et al. | |
| 2024/0196499 A1* | 6/2024 | Bedell | H05B 47/16 |
| 2025/0056696 A1* | 2/2025 | Yokum | H05B 47/16 |
| 2025/0103011 A1* | 3/2025 | Wu | G01J 1/0228 |

* cited by examiner

DYNAMIC THRESHOLDING FOR AMBIENT LIGHT-BASED LOAD CONTROL

BACKGROUND

Many electronic load controllers control the switching on and off of a load based on environmental conditions. In the example of a controller for an outdoor lighting load like a floodlight or landscape light, the controller might turn the light on and off in response to changes in ambient light level in the environment in which the light is situated. Often such controllers operate using a fixed light threshold, by which the lighting load is turned on when the ambient light in the environment is darker than the fixed light threshold, and is turned off when the ambient light in the environment is brighter than the fixed light threshold. Sometimes a fixed hysteresis is applied to the threshold such that the ambient light level in the environment must change by a certain amount above or below the fixed light threshold before the light state (on/off) is changed.

SUMMARY

The design or application of these controllers typically requires that an ambient light sensor be positioned such that the ambient light level being sensed/measured by the sensor is not significantly impacted by the light emitted from the light when it is switched on. Otherwise, switching on the light results in the ambient light sensor reading an artificially high ambient light level because the lighting load itself is contributing to the sensed level. This can cause the controller to switch off the lighting load as if the true ambient light level has risen above the threshold.

Aspects described herein improve operation of ambient light sensor-based load control by adjusting a control threshold, for instance a turn-off threshold light level (also referred to herein as a "turn-off threshold"), based on the ambient light level as it is (or may be) affected by the controlled lighting load when switched on. In embodiments, after switching on the controlled lighting load and awaiting lapse of an amount of time thereafter, a process measures the then-current ambient light level and uses that measured, then-current ambient light level to determine and adjust/set a turn-off threshold light level. In some examples, the current ambient light level just sensed is, alone, taken as a good representation of the current ambient situation and is used as a "representative" current ambient light level based on which to set the turn-off threshold light level. In other examples, that current ambient light level is used in conjunction with one or more prior-sensed ambient light levels to form the 'representative' current ambient light level that is taken as the good representation of the current ambient situation and used to set the turn-off threshold light level. In either of these two situations, the current ambient light level is used in adjusting the turn-off threshold light level, which is the threshold used for determining whether to switch off the lighting load, i.e., cut the supply of electrical power to the lighting load. The turn-off threshold can be set such that ambient light level in the environment must be brighter than the representative current ambient light level (either the current ambient light level itself or another representative current ambient light level based thereon) by a certain amount before the light will be turned off.

Without dynamically adjusting/setting the turn-off threshold in this manner, a situation of constant on/off cycling might result. If the ambient light sensor is impacted by the increased brightness caused by the controlled light turning on, the controller might turn back off the light soon after it turned on the load. This could cause the controller to turn back on the light and repeat this cycling on and off until true ambient light level is sufficiently high that it is above the turn-on threshold.

Aspect can advantageously be applied in applications where an ambient light sensor is used to sense ambient light levels in an environment for use by a microcontroller or other processing circuit in determining when to switch on and off a lighting load in response to changes in the ambient light level. Examples of such applications are outdoor lighting controls that turn on lights when ambient light decreases sufficiently low (i.e., dark, nighttime) and subsequently turn off lights when ambient light increases sufficiently high (i.e., light, daytime).

Shortcomings of the prior art are overcome and additional advantages are provided through the provision of an electrical load controller for controlling conduction of a supply of electrical power to a lighting load in an environment. The electrical load controller includes a line input terminal and a load output terminal, the line input terminal configured to be electrically coupled to the supply of electrical power, and the load output terminal configured to be electrically coupled to the lighting load. The electrical load controller also includes a sensor configured to sense ambient light levels in the environment, a switch electrically coupled in series between the line input terminal and the load output terminal, the switch being controllable to selectively couple the supply of electrical power to the lighting load and decouple the supply of electrical power from the lighting load, and a processing circuit. Based on an ambient light level in the environment decreasing to a turn-on threshold light level, the processing circuit is configured to control the switch to couple the supply of electrical power to the lighting load. The sensor is configured to sense a current ambient light level in the environment after a lapse of a predetermined amount of time subsequent to the processing circuit controlling the switch to couple the supply of electrical power to the lighting load, and the processing circuit is configured to adjust a turn-off threshold light level using the current ambient light level.

Further, a method is provided for controlling conduction of a supply of electrical power to a lighting load in an environment. The method includes sensing an ambient light level in the environment decreasing to a turn-on threshold light level, based on the sensing the ambient light level in the environment decreasing to the turn-on threshold light level, controlling a switch of an electrical load controller to couple the supply of electrical power to the lighting load, the switch being controllable to selectively couple the supply of electrical power to the lighting load and decouple the supply of electrical power from the lighting load, sensing a current ambient light level in the environment after a lapse of a predetermined amount of time subsequent to the controlling the switch to couple the supply of electrical power to the lighting load, and adjusting a turn-off threshold light level using the current ambient light level.

Yet further, an electrical load controller is provided for controlling conduction of a supply of electrical power to a lighting load in an environment, and the electrical load controller includes a line input terminal and a load output terminal, the line input terminal configured to be electrically coupled to the supply of electrical power, and the load output terminal configured to be electrically coupled to the lighting load. The electrical load controller also includes a sensor configured to sense ambient light levels in the environment, a switch electrically coupled in series between the line input terminal and the load output terminal, the switch being controllable to selectively couple the supply of electrical power to the lighting load and decouple the supply of electrical power from the lighting load, and a processing circuit. The processing circuit is configured to set a turn-off threshold light level based on lapse of a predetermined amount of time after controlling the switch to couple the supply of electrical power to the lighting load, the turn-off threshold light level being a threshold at which the processing circuit is configured to control the switch to decouple the supply of electrical power from the lighting load.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for load control, i.e., controlling conduction of a supply (ON, OFF) of electrical power to a load based on ambient light sensing and dynamic thresholding. As context for aspects described herein, many countries have an electric grid infrastructure that uses alternating current ("AC") as a power source (referred to herein as an "AC source") for supplying AC power. These systems can be either balanced or unbalanced and may include a phase line ("phase conductive path") and a return path (usually referred to as a "neutral" line or "neutral conductive path"). The "neutral" conductive path can be used as a return path for the AC source supplied by a phase conductive path. A conductive path can also be referred to as a "wire". The terms "conductive path", "conductor", and "wire" are considered herein to be synonymous. For safety reasons, the neutral wire is typically grounded at some juncture, for instance the main electrical panel. Although a ground wire is typically present at all electrical boxes, a neutral wire may or may not be present in some electrical boxes, such as some switch wall boxes used to control a load. In such instances where the neutral wire is absent, the electrical/wall box typically contains a phase wire, a load wire, and a ground wire (or ground connection via a metal sheath of the electrical cable). As such, the load is to be controlled by a device referred to as a "two-wire device" (examples of which are a switch or a dimmer), where the phrase "two-wire" refers to the phase wire and the load wire (e.g. the absence of a neutral wire), though a two-wire device does not exclude the possibility of the device being connected to a third, ground wire. In contrast, "three-wire" devices typically refer to devices configured to connect to a phase wire, a neutral wire, and a load wire (in addition to ground). Aspects described herein can apply to both two-wire and three-wire devices.

Many dwellings and office buildings use either a single or multi-phase AC source and/or some combination thereof. The AC source may be accessed by standardized connections, referred to as "plugs", that prevent a user from improperly connecting to an AC source, e.g., a three-phase AC plug cannot connect to a two-phase AC outlet. Additionally, many AC sources may selectively apply electricity to a load based upon whether a switch is turned on or off, e.g., a light switch.

Figure 1:
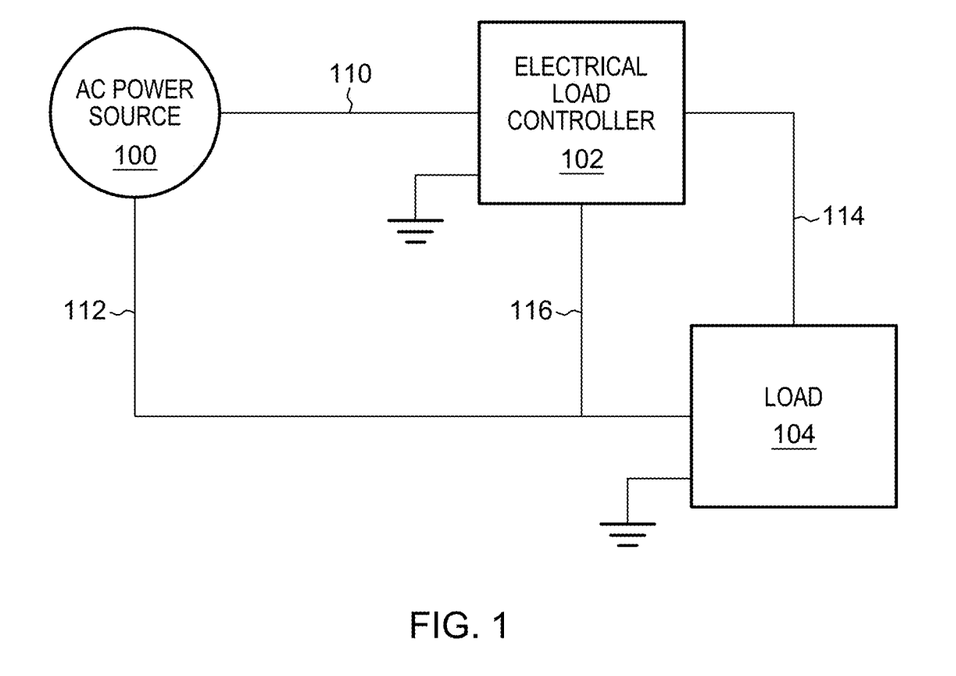
FIG. 1 depicts an example load control system in which an electrical load controller controls a supply of electrical power to a load.

FIG. 1 depicts an example load control system in which an electrical load controller controls a supply of electrical power to a load 104. The system includes AC power source 100, electrical load controller 102, and load 104. AC electrical power is supplied by AC source 100 to the electrical load controller 102 via phase conductive path 110 (also referred to as "hot" or "line"), and the electrical load controller 102 is electrically coupled to load 104 via load wire or conductive path 114 which is coupled to AC source 100 via neutral conductive path 112. The electrical load controller 102 in this example also has a direct connection to neutral via line 116, for instance to enable the electrical load controller to remain continuously powered even when a switching circuit to conduct electrical power via 114 to the load 104 is in the OFF/open state.

The electrical load controller 102 controls delivery of electrical power to the load 104 by way of a switching circuit (interchangeably referred to herein as a "switch") typically provided as a component of the controller 102 itself. The electrical load controller can include digital control electronics and code for execution to perform various aspects, including aspects described herein to operate a power switching circuit of the load controller 102 and regulate delivery of power to the load. The switching circuit can transition between an OFF state, in which the switching circuit of the load controller 102 does not conduct the supply of electrical power to the load 104, and an ON state in which the switching circuit conducts the supply of electrical power to the load 104. The switching of the switching circuit can be controlled by the digital control electronics, for instance signal(s) provided to the switching circuit to control a state (e.g. ON or OFF) of the switching circuit. The digital control electronics and/or code can be implemented via one or more processor, microprocessor, controller, microcontroller, or the like (which are referred to herein collectively as a "processing circuit"). References herein to 'switching on' or 'switch on' the load refers to the transitioning of the switching circuit to the ON state to supply power to the load, and references to 'switching off' or 'switch off' the load refers to the transitioning of the switching circuit to the OFF state to cut supply power to the load, in which the switching circuit does not conduct the supply of electrical power to the load. In other words, the switch that is electrically coupled in series between the line input terminal and the load output terminal is controllable (i.e., by a processing circuit) to selectively couple the supply of electrical power to the lighting load (i.e., switch on the load; transition the switch to the ON state) and decouple the supply of electrical power from the lighting load (i.e., switch off the load; transition the switch to the OFF state).

The load controller 102 can be coupled to, or include, one or more user-accessible actuators (not pictured) that a user may be able to engage or otherwise interface with to provide command information, which the load controller 102 receives and interprets as a command or a set of commands to perform one or more actions or configure settings for, or relating to, controlling operation of the load controller 102 and therefore controlling the delivery of electrical power to the load 104.

In this manner, the load controller 102 can control the supply of electrical power to the load 104 by, for example, tailoring the parameters used by the microcontroller for activating the switching circuit (i.e., controlling the switch to selectively couple the supply of electrical power to the lighting load and decouple the supply of electrical power from the lighting load). An example switching circuit is a Triode for Alternating Current (TRIAC) switching element, though other switching circuits are possible, for instance Silicon-controlled Rectifiers (SCRs), or Metal-Oxide-Semiconductor Field-Effect Transistors (MOSFETs), as examples.

Optionally, load controller 102 can incorporate dimming functions that control current provided to the load 104, for instance to control brightness of a light of the load.

The electrical load controller 102 can sense, determine, compute, obtain, etc. indications of environmental conditions, for instance through received readings/values/levels indicative of ambient light conditions in an environment. In some embodiments, the controller 102 incorporates, or is in communication with, an ambient light-sensing element (sensor) that senses levels of, or indicative of, ambient light in the sensor's surrounding environment. Such sensing might be performed continuously and/or at discrete points in time. In some embodiments, an ambient light sensor is implemented as a phototransistor whose resistance varies with the ambient light level, and the phototransistor is part of a resistor divider network where the resulting voltage is measured by an A/D (analog-to-digital) converter. A component, such as the processing circuit or another component of the load controller of the sensor, as examples, can perform an A/D conversion whenever desired (for instance periodically every n minute(s)) to determine the ambient light level at such time.

The environment in which ambient light is sensed could be the environment in which the controller itself 102 is situated or could be a different environment. In any case, sensor(s) can be provided as part of the load controller 102 if installed in the environment and/or can be located remote from the load controller and communicatively coupled to the load controller 102 (directly, or indirectly through other system(s)) via wired or wireless connection(s) to provide sensed values to the load controller 102.

A specific example of a load controller is an exterior switch that plugs into an electrical receptacle and receives from ambient light sensor(s) sensed levels, values, or other data corresponding to and indicative of ambient light levels. One, some, or all of the sensor(s) is/are incorporated into a housing of the load controller or is/are located remote from the load controller, and either hardwired thereto or in communication therewith (wirelessly, directly or indirectly over one or more network(s)) to communicate the sensed ambient light levels to the load controller. In an example application of such a load controller, one or more lighting loads are electrically coupled via plug or hardwire to the load controller.

Ambient light sensing to control selective coupling of the supply of electrical power to the lighting load and decoupling the supply of electrical power from the lighting load is provided in accordance with aspects described herein. Ambient light in an environment can be a useful indicator of light (e.g., daytime) and dark (e.g., nighttime) conditions of the environment, and is commonly used to control outdoor lighting, and other types of, loads to switch the loads on during the night and off during the day.

Figure 2:
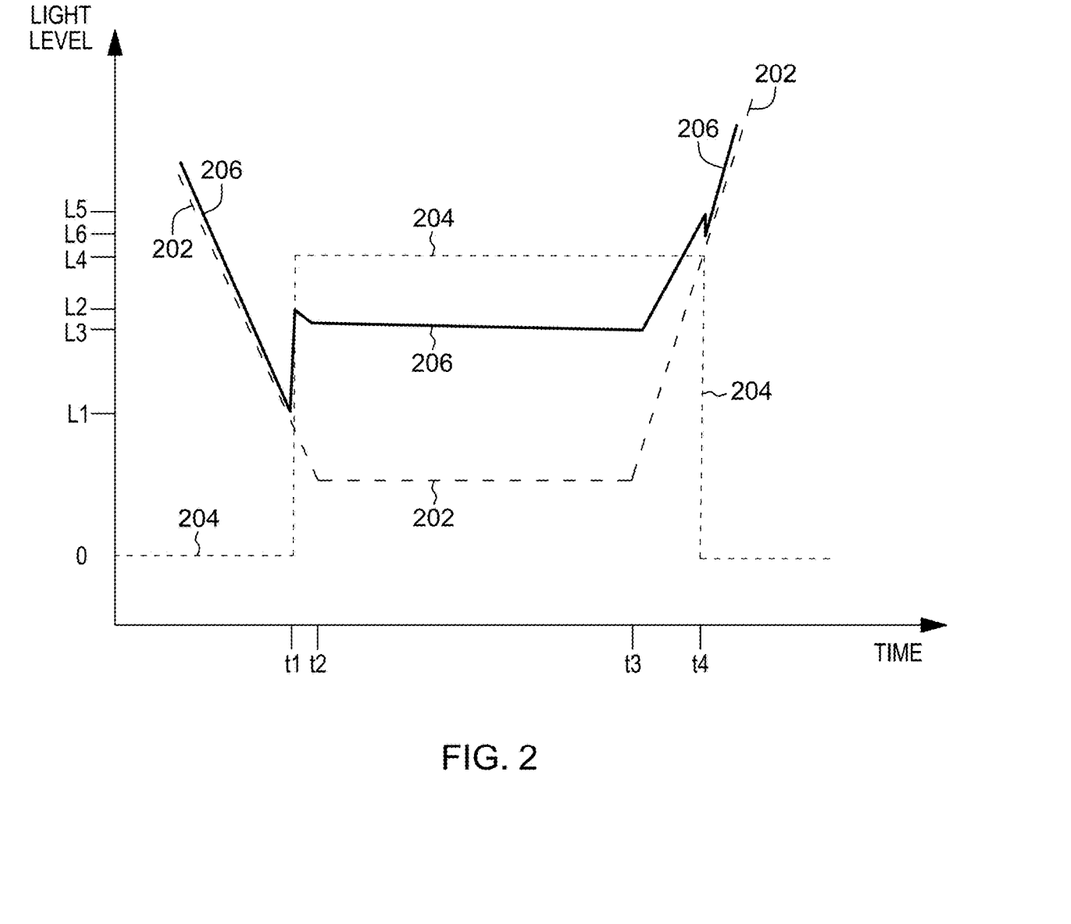
FIG. 2 depicts an example conceptual illustration of ambient light-based load control using dynamic thresholding, in accordance with aspects described herein.

Aspects are described with initial reference to FIG. 2, depicting an example conceptual illustration of ambient light-based load control using dynamic thresholding, in accordance with aspects described herein. Specifically, FIG. 2 depicts a plot showing various light levels (y-axis), in lumens or lux for instance, as a function of time (x-axis).

Plot 202 in large-dash line shows the true ambient light level over time in an environment. 'True ambient light' means the level of ambient light that is present at the location of the ambient light sensor of a subject controller absent any contribution of light from lighting load(s) that are to be controlled by a subject controller. In examples, this plot 202 is a representation of ambient light level in an outdoor location where the lighting condition is dictated largely or entirely by the presence/absence of sunlight. True ambient light level as depicted by plot 202 is shown decreasing steadily, for instance based on the sun setting, to a time, t2, followed by a length of time from t2 to t3 during which ambient light level remains relatively low and steady, for instance during nighttime hours. True ambient light then increases from time t3, for instance based on the sun rising to increasingly illuminate the location.

Plot 204 represents the level of light output from a lighting load based on switching on the supply of electrical power to the load. One cycle of switching the load on and then off is shown here. Over time, this plot 204 forms substantially a square wave corresponding to the switching-on and switching-off of the load. In this example, the load is switched-on at time t1. The light output from the load increased from 0 (no output) to level L4. The load outputs a substantially constant light level in this example until time t4 when it is switched off, after which time it outputs no light until it is switched-on again in a next cycle.

Plot 206 represents the ambient light level as detected by the ambient light sensor under the conditions discussed above. Prior to time t1, the load is off and the sensed ambient light level (indicated by plot 206) is the true ambient light level indicated by plot 202. The two plots are shown slightly set apart from each other in FIG. 2 for ease of illustration.

Approaching time t1, the true ambient light level decreases and this decrease is sensed as shown by plot 206. At time t1, the true/sensed ambient light level decreases to a turn-on threshold at level L1. Detecting this, the microcontroller or other type of processing circuit of the load controller transitions the switching circuit of the load controller to the ON state, i.e., controls the switch to couple the supply of electrical power to the lighting load, which turns on as reflected by plot 204. The increase in light output from the lighting load is near instantaneous at time t1. The ambient light sensor and lighting load are positioned in this example in such a way that the lighting load affects the level of ambient light sensed by the ambient light sensor. As such, the sensor sensed an increased level of ambient light and plot 206 increases to level L2 as indicated. The sensed ambient light level at t1 is a composite of (i) light contributed by the lighting load-now switched-on, and (ii) the true ambient light at that time. From time t1 to time t2, true ambient light level continues to decrease and the sensed ambient light level indicated by plot 206 also decreases until true ambient light level reaches its minimum level at time t2.

From time t2 to time t3, each of (i) the light level output from the lighting load indicated by plot 204, (ii) the true ambient light level indicated by plot 202, and (iii) the sensed ambient light level indicated by plot 206 remain substantially unchanged.

At time t3, the true ambient light level begins to increase. As one example, the sun begins rising at that location and the resulting increase in sunlight in the environment causes a brighter ambient light condition. The increase in true ambient light level also causes the measured ambient light level (plot 206) to increase in this example. The difference between the true ambient light level reflected by 202 and the measured ambient light level reflected by 206 continues to be caused by light that is output from the lighting load while it remains on. Eventually, the measured ambient light level (plot 206) meets or exceeds a turn-off threshold light level (L5) that is set in accordance with aspects described herein. This occurs at time t4. At that point, the microcontroller transitions the switching circuit of the load controller to the OFF state to cut the supply of electrical power to the lighting load. The load switches off at time t4 and the light output therefrom falls back to 0. Because of this, the sensed ambient light level (plot 206) drops to level L6 to meet and again track the true ambient light level (202) as it continues to increase. Eventually true ambient light level will again decrease, and subsequent cycles of what is depicted in FIG. 2 will occur.

Thus, in the embodiment of FIG. 2, a microprocessor leverages an ambient light sensor and switches, via control of the switching circuit, a controlled light on and off in response to changes in the ambient light level as sensed by the sensor. The microprocessor could, for example, periodically (e.g., every 1 minute) sample (e.g., by checking, sensing, determining) ambient light level from the sensed value(s) received from the sensor, and determine whether that ambient light level has dropped to a predetermined threshold, i.e., the turn-on threshold light level ($T_{ON}$). If the sampled ambient light level is $T_{ON}$ or lower, the controlled light is switched on. Similarly, at some later time when the ambient light level has increased to a predetermined threshold, i.e., the turn-off threshold light level ($T_{OFF}$), the controlled light is switched off.

In embodiments, the threshold $T_{ON}$ at which the light is switched on is a predetermined fixed ambient light level. This could be pre-programmed into the load controller and/or could be selected, for instance by a user. As yet another possibility, it is automatically determined by analyzing changes in the ambient light level in the environment as the environment transitions between ambient conditions, for instance from daylight to darkness then back to daylight, and so on.

After switching-on the load, the threshold $T_{OFF}$ at which to switch-off the light can be determined in accordance with aspects described herein based on sampling the ambient light level based on passage of some time after the controlled light is switched on, and using that sampled light level to determine an appropriate turn-off threshold. The amount of time after switching on the load may be a predetermined amount of time, also referred to herein as a dynamic sample time. In examples, the dynamic sample time is 5 minutes after switching-on the load. Because the sampled ambient light level might be affected by the controlled light increasing the ambient light around the sensor, sampling the ambient light level, for instance using the sensor's sensed current ambient light level, after the light is switched on provides an indication of what effect, if any, the lighting load had on the ambient light level reading. Using this sensed current ambient light level to set the turn-off threshold can avoid undesired power cycling of the light. If switching-on the lighting load caused the ambient light level sensed by the sensor to indicate something sufficiently high (e.g., above a turn-off threshold set lower than that level), then conventionally the controller might take this reading to indicate that it is no longer dark and therefore switch-off the light. This can result in cycling until the true ambient light level is high enough that the load remains off.

According to aspects described herein, the ambient light level determined after (by at least the predefined amount of time) switching-on the light is used in setting/adjusting the $T_{OFF}$ threshold as appropriate and as described herein, for instance to ensure sure the $T_{OFF}$ threshold is set to be a level brighter than that ambient light level.

A cycle delay time, or 'minimum transition time', may also be used to eliminate cycling the controlled light on and off should the ambient light level vary slightly around the switching threshold. The cycle delay time is a minimum amount of time that must pass before consecutive transitions of the switching circuit between states. For instance, if the cycle delay time is 10 minutes, then at least 10 minutes must pass after the switch changes from one state by coupling (or decoupling) the supply of electrical power before the switch is allowed to be controlled to transition back to the one state. A process can reset (e.g., back to 10 minutes) the cycle delay time whenever the switching circuit changes state. The process can decrease the cycle delay time toward zero and check it at various points to determine whether it has decreased to zero, i.e., lapsed, for instance in order to determine whether the load controller can perform a next transition between coupling/decoupling the power to the load.

The dynamic sample time can be initialized to a fixed amount of time, for instance 5 minutes, which can be counted down using a timer or iterative decrement (as examples) that begins when the load is switched on. A current ambient light level can be sensed after this time lapses. That current ambient light level can be used as-is or used with additional prior-sensed ambient light levels as described herein in determining the turn-off threshold. For instance, the turn-off threshold is set as a percentage above the representative current ambient light level-either the current ambient light level or the ambient light level determined using the current ambient light level and the prior-sensed light levels.

$T_{OFF}$, the dynamic threshold, can be initialized to a default turn off threshold, which could be the turn-on threshold $T_{ON}$ or any other initial level higher or lower than $T_{ON}$. This can be done at the time the load is switched-on, for instance, and be subject to adjustment as described herein. In examples, $T_{OFF}$ is initialized in this manner each time the light is switched-on.

A light/dark state may also be maintained to indicate a current ambient condition of the environment, for instance as between a time when the lighting load is to be off (e.g., the 'light' state corresponding to daytime), and a time when the lighting load is to be on (e.g., the 'dark' state corresponding to nighttime). The light/dark state can be a variable for tracking the current state in order to inform the proper threshold ($T_{ON}$ or $T_{OFF}$) to check at any given time.

Aspects are further illustrated and described with reference to FIGS. 3A-3B, which depict an example process for controlling conduction of a supply of electrical power to a load based on ambient light sensing and dynamic thresholding. In examples, the process is performed in whole or part by a load controller, for instance in whole or in part by a processing circuit thereof. More specifically, the load controller can be configured to perform the process periodically, for instance at a frequency of every 1 minute. In examples, this corresponds to a sample frequency at which to sample/sense current ambient light level by/using/leveraging an ambient light sensor.

Figure 3A:
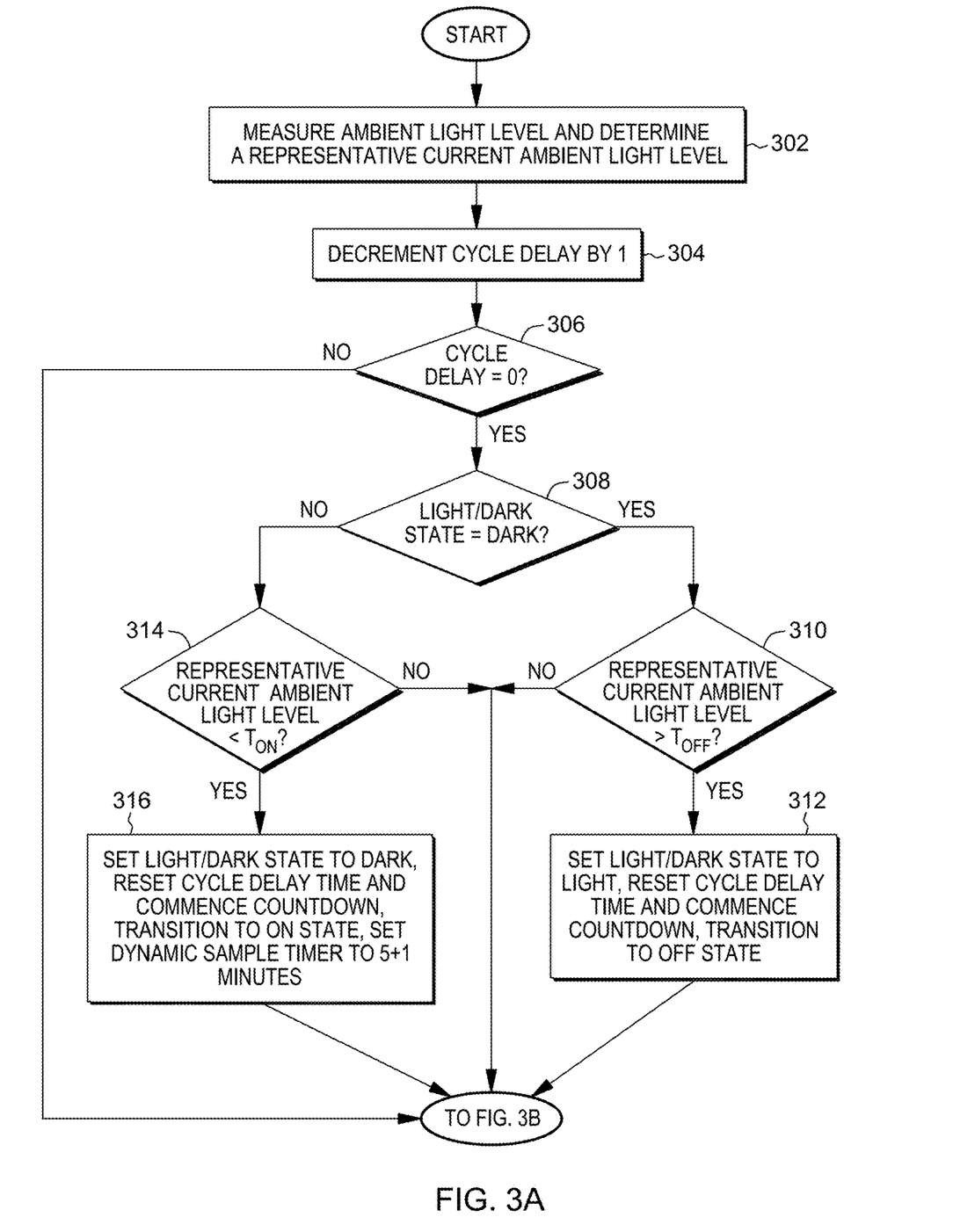
FIGS. 3A-3B depict an example process for controlling conduction of a supply of electrical power to a load, in accordance with aspects described herein.

Referring initially to FIG. 3A, the process leverages the ambient light sensor at 302 to measure the then-current ambient light level in the environment and determine a representative current ambient light level. In one example the representative current ambient light level is the sensed current ambient light level that was just sensed using the sensor and determined/calculated/obtained by the processing circuit. In another example, ambient light level are smoothed by way of an averaging/filtering algorithm to eliminate any short-term fluctuations. In this regard, the algorithm could average the last n number of sensed ambient light level readings (including the current ambient light level that was just sensed), or perform some other calculation using a set of historic ambient light level readings together with the then-current ambient light level, to determine the representative current ambient light level, which is taken as being representative of the ambient lighting in the environment at the time for purposes of determining whether to off the load, turn on the load, and/or set a threshold value.

The process continues by decrementing (304) by 1 (corresponding to the rate at which the process is performed) a cycle delay timer or other construct that counts down the cycle delay time, as long as that timer is greater than zero. If the time has already decremented to zero, then in some embodiments this decrement at 304 does not occur. In any case, the process continues by determining (306) whether the cycle delay time is equal to 0 (i.e., has lapsed, which could have occurred on this iteration or a prior iteration). If cycle delay time is 0 (306, Y), the process determines (308) whether the light/dark state=dark. This determines whether the current ambient condition is nighttime, which in turn informs the appropriate threshold (turn-on or turn-off) to check against the representative current ambient light level that was determined at 302.

If the light/dark state=dark (308, Y), the process determines (310) whether the first measured ambient light level determined at 302 is brighter/greater than (or optionally equal to) $T_{OFF}$. If so (310, Y), then the lighting load is to be switched off. The process therefore proceeds to 312 to (i) set the light/dark state to light since a transition is about to be made to turn off the load, (ii) reset the cycle delay time (e.g., to 10 minutes), and (iii) transition the switching circuit of the controller to the OFF state to switch off the load, i.e., control the switch to decouple the supply of electrical power from the lighting load.

If instead at 308 it was determined that the light/dark state is not 'dark' (308, N), then the state is 'light', in which case the process determines (314) whether the representative current ambient light level determined at 302 is lower than (or optionally equal to) $T_{ON}$. This determination checks whether the representative current ambient light level has gone below (or at least fallen to) the threshold to switch on the load. If so (314, Y), then the lighting load is to be switched on. The process therefore proceeds to 316 to (i) set the light/dark state to dark since a transition is about to be made to turn on the load, (ii) reset the cycle delay time (e.g., to 10 minutes), (iii) transition the switching circuit of the controller to the ON state to switch-on the load, i.e., control the switch to couple the supply of electrical power to the lighting load, and (iv) set the dynamic sample time to begin countdown. Because this dynamic sample time is decremented by 1 at 318 (discussed below), the dynamic sample time may be set to 1 greater than the desired delay. For example, if it is desired to wait 5 minutes after switching on the load before determining the level at which to set the turn-off threshold using the then-current ambient light level, the dynamic sample time is set to 6.

Figure 3B:
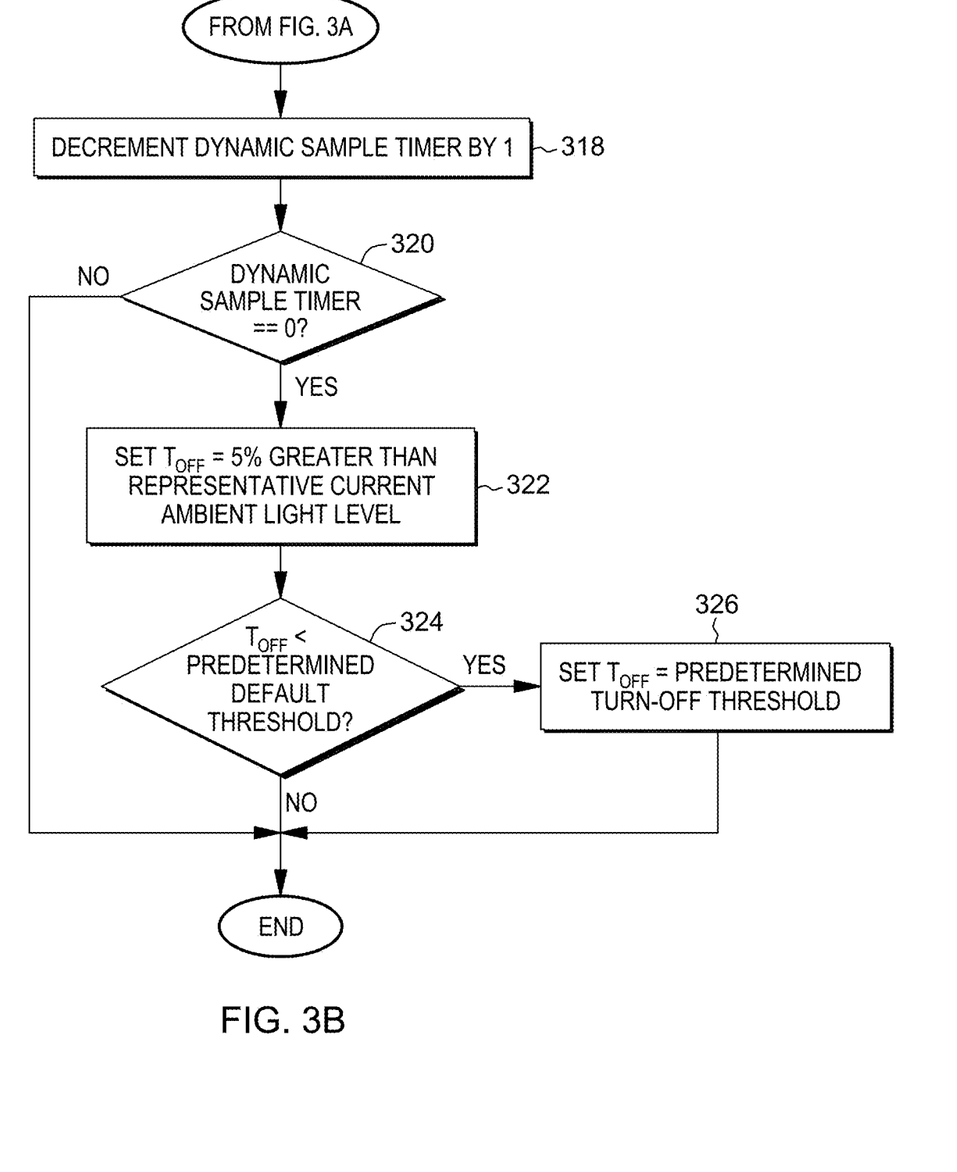

If at 306 it was determined that the cycle delay is not 0, i.e., the minimum transition time has not lapsed and therefore no ON/OFF state transition should be performed, or if at 310 it was determined that the first measured ambient light level determined at 302 is not brighter (greater) than $T_{OFF}$ (310, N) and therefore the load should remain switched on, or if at 314 it was determined that the first measured ambient light level determined at 302 is not less than $T_{ON}$ (314, N), the process proceeds to FIG. 3B.

Referring to FIG. 3B, the process decrements (318) the dynamic sample time by 1 if it is greater than zero. This is utilized on each iteration to decrease the dynamic sample time toward zero so that the $T_{OFF}$ threshold can be set appropriately after the dynamic sample time has lapsed. Accordingly, after decrementing the dynamic sample time, the process determines (320) whether the dynamic sample time is equal to 0. If not (320, N), then the process ends (to be iterated 1 minute later, for example). Otherwise, (320, Y), the dynamic sample time has lapsed and so the process at this point sets (322) $T_{OFF}$ to be higher than the representative current ambient light level determined at 302, for instance sets $T_{OFF}$ to be 5% greater than the representative current ambient light level. The process then proceeds by determining (324) whether the newly-set $T_{OFF}$ is darker (a lower light level) than a predetermined, default turn-off threshold. This might be the case where light output from the load has relatively little or no effect on the sensed ambient light in the environment; in these situations, the sensed ambient light is effectively a good representation of the true ambient light. The true ambient light might have decreased sufficiently during the dynamic sample time that, upon lapse of the dynamic sample time, the sensed current ambient light level and therefore the representative current ambient light level is substantially lower than $T_{ON}$ such that setting $T_{OFF}$ based on the determined representative current ambient light level sets $T_{OFF}$ to be lower than desired. If, for instance, the light should be switched-off only after it is at least as bright out as when the light was switched-on, then it would be desired for $T_{OFF}$ to be, at a minimum, equal to $T_{ON}$. A predetermined default $T_{OFF}$ could be used to enforce this and used in case the process set $T_{OFF}$ at 322 to something lower than desired, for instance lower than the predetermined default, such as $T_{ON}$ or another level. Therefore, if $T_{OFF}$ is set darker at 322 than the predetermined, default turn-off threshold (324, Y), the process sets (326) $T_{OFF}$ to be the predetermined, default turn-off threshold, otherwise (324, N) the process ends. This forces the turn-off threshold to be the brighter of (i) what was set at 322 (e.g., 5% above the representative current ambient light level) and (ii) the default turn-off threshold.

Accordingly, electrical load controllers, and processes of operation of such electrical load controllers, for controlling conduction of a supply of electrical power to a load are described herein. Such processes can be performed by one or more apparatuses, such as electrical load controllers as described herein for controlling conduction of a supply of AC power to an electrical lighting load, for instance a light or a load that includes a light. The electrical load controller can include a line input terminal and a load output terminal, the line input terminal configured to be electrically coupled to the supply of electrical power, and the load output terminal configured to be electrically coupled to the load. The electrical load controller can, in some embodiments, be a 'two-wire' device with no connection to neutral, and in other embodiments have a connection to neutral.

The electrical load controller can further include a switch electrically coupled in series between the line input terminal and the load output terminal. The switch can be controllable to selectively (i) couple the supply of electrical power to the lighting load, i.e., have an ON state in which the switch conducts the supply of electrical power to the load, and decouple the supply of electrical power from the lighting load, i.e. have an OFF state in which the switching circuit does not conduct the supply of electrical power to the load. In examples, The switch can be configured to be selectively controlled by varying a control signal between an ON state, in which the switch conducts the supply of power to the load, and an OFF state. The electrical load controller can further include other components, such as sensor(s) configured to sense/measure one or more environmental conditions, such as the level of ambient light in the environment. The electrical load controller can further include a processing circuit, for instance a microcontroller or microprocessor, as examples, to perform aspects of processes described herein. The processing circuit can be configured to execute program instructions, for instance that cause the electrical load controller to perform, and/or initiate performance by other components of, actions such as transitioning the switch to one state (such as ON) from another state (such as OFF) and therefore control the switch to couple the supply of electrical power to the lighting load and decouple the supply of electrical power from the lighting load. Thus, in examples, the processing circuit executes program code to perform a process for operating an electrical load controller to control conduction of the supply of electrical power (such as AC power) to the lighting load. An example such process is that described with reference to FIGS. 4A-4B.

Figure 4A:
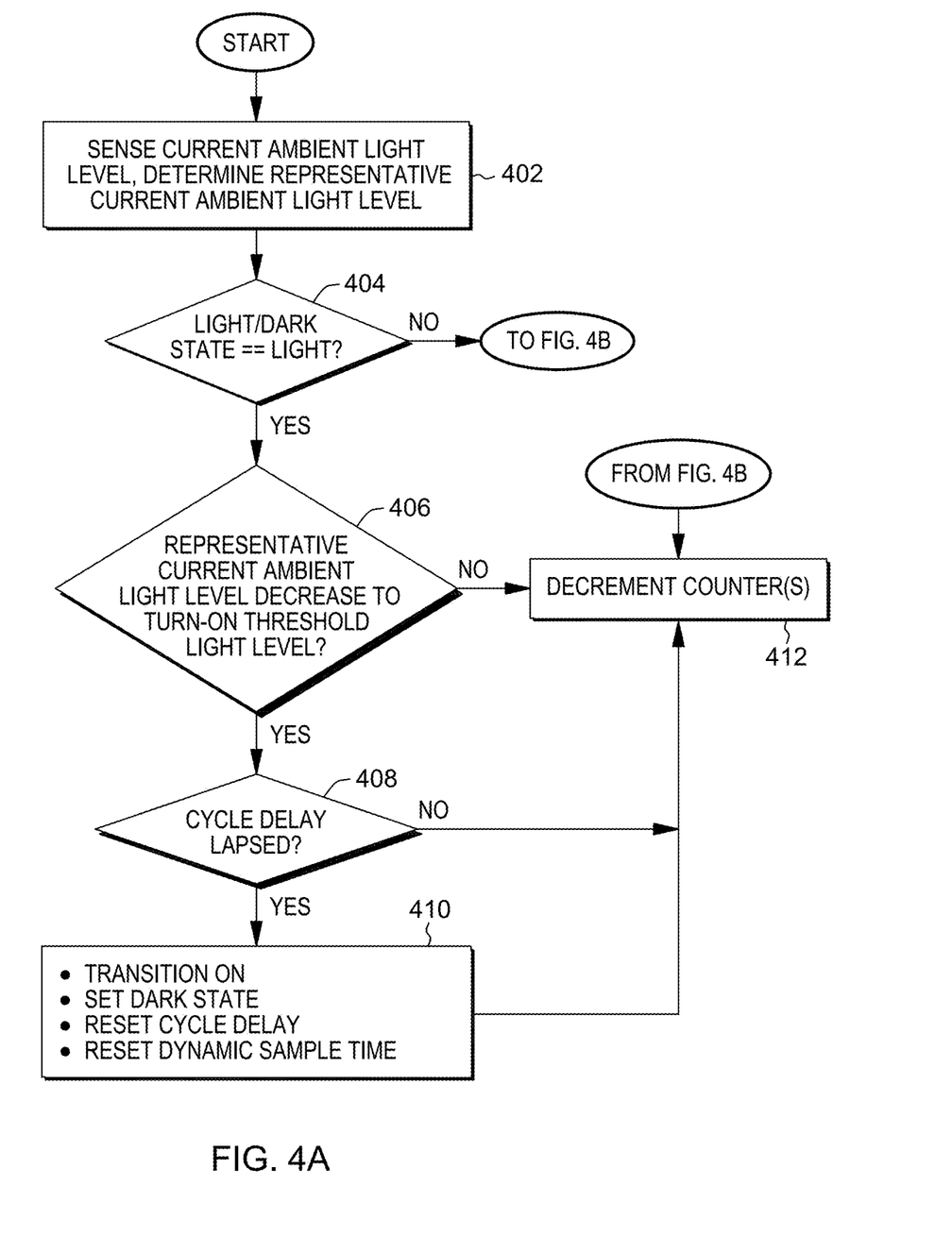
FIGS. 4A-4B depict a further example process for controlling conduction of a supply of electrical power to a load, in accordance with aspects described herein.
Figure 4B:
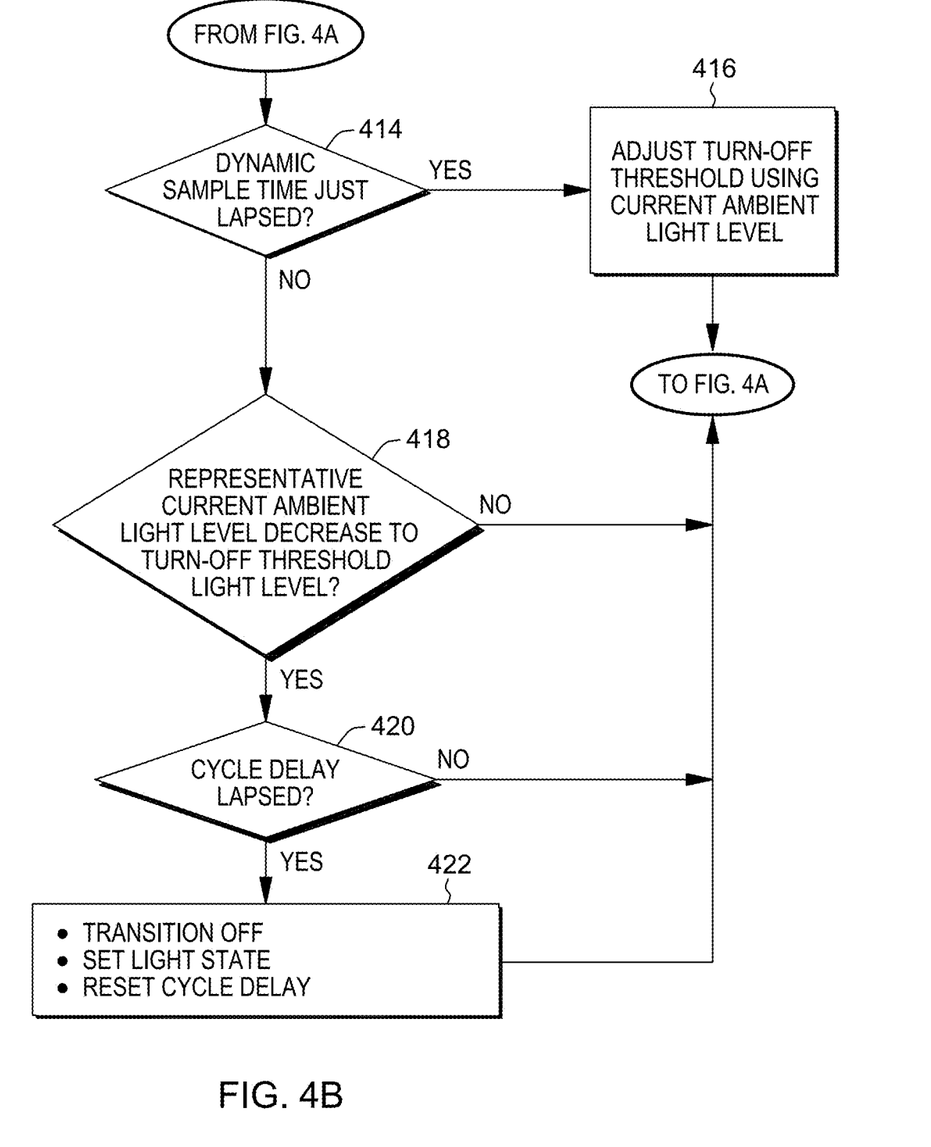

In accordance with FIGS. 4A-4B the control of the conduction of the supply of electrical power to the load is based, at least in part, on sensed environmental conditions, for instance sensed ambient light levels in an environment. The load can be a lighting load, for instance a lighting load that provides light in the environment. In some examples, aspects of the process are performed by the electrical load controller itself that includes a switch and sensor, though in other examples some or all aspects are performed by one or more computer systems in communication with an electrical load controller having the switch (and optionally also the sensor). In this regard, a remote system could act as a controller of an electrical load by performing processing described herein and communicating with another device (such as a wall box electrical load controller having the switch) to provide commands that control the switch to selectively couple the supply of electrical power to the lighting load and decouple the supply of electrical power from the lighting load.

The process of FIGS. 4A-4B can be run iteratively and periodically, for instance by initiating/commencing execution and starting (e.g., with FIG. 4A) at a frequency of every n seconds or minutes, where n>0. In alternative embodiments, a process starts and incorporates iterations of aspects of FIGS. 4A-4B therewithin, for example using sleep and resume commands, in which the iterating occurs within the process itself.

Initially, some variables that are maintained and used in the process may be initialized. Example variables are:
 a cycle delay time;
 a turn-on threshold light level (a predetermined ambient light level, for instance one that is user-selected or is automatically determined based on analyzing changes in ambient light level in the environment as the environment transitions between daylight and nighttime ambient conditions);
 a turn-off threshold light level;
 a dynamic sample time (also referred to as a 'predetermined amount of time' to delay a desired adjustment to the turn-off threshold based on an ambient light level sensed after the delay); and
 a light/dark state indicating a current ambient condition of the environment as being either daytime or nighttime.

Referring to FIG. 4A, the process senses (402), using a sensor in one example, a current ambient light level in the environment and determines a representative current ambient light level using the sensed current ambient light level. As noted, in some examples the sensed current ambient light level itself is taken as the representative current ambient light level, while in other examples this current ambient light level is used with other, previously-sensed ambient light levels, to determine the representative current ambient light level. Since the processing iterates periodically, for instance every minute, this sensing and determining is being performed iteratively. In this regard, the next representative current ambient light level that is determined at each iteration could be the then-current ambient light level that was just sensed at that iteration, or it could be calculated as a function that uses the current ambient light level that was just sensed at that iteration together other ambient light level(s) sensed at prior iteration(s). For example, the representative current ambient light level determined on a given iteration could be the average of the latest (most recent) n number of sensed current ambient light levels, which includes the current ambient light level that was just sensed at that iteration.

Proceeding with FIG. 4A, the process determines (404) whether the light/dark state is light. If the light/dark state is not light (404, N), then the process is operating under a dark condition (e.g., nighttime, or when the load is switched ON and therefore the process is to determine whether to switch OFF the load) and the process proceeds to FIG. 4B described below.

If instead the light/dark state is light (404, Y), the process is operating under a light condition (e.g. daytime, or when the load is switched OFF and therefore the process is to determine whether to switch ON the load). The process proceeds by checking first whether the representative current ambient light level has fallen low enough that the load should be switched ON. In this example, this condition is satisfied when then representative current ambient light level drops to at, or below, the current turn-on threshold, and therefore the determination (406) is whether the representative current ambient light level has decreased to (i.e., is at or below) the turn-on threshold light level. If not (406, N), then the process continues by decrementing counter(s) (412), as described below, before ending until the next iteration. Otherwise (406, Y), the process then checks (408) whether the cycle delay has lapsed. 'Lapsed' in this context means that it has decremented to zero. The cycle delay controls how soon after the last transition the switch can be transitioned again. If the cycle delay has lapsed (408, Y), then based on this and the ambient light level in the environment (as represented by the representative current ambient light level) having decreased to a turn-on threshold light level, the process at 410 proceeds with processing circuit transitioning the load ON by controlling the switch to couple the supply of electrical power to the lighting load, setting the light/dark state to 'dark' to indicate the ambient condition as nighttime, resetting the cycle delay time for commencing countdown again, and resetting the predetermined amount of time (dynamic sample time) for commencing countdown of the dynamic sample time. At that point, the process proceeds to decrement counter(s) (412).

If instead the cycle delay has not lapsed (408, N), then the switch is not to couple the supply of electrical power to the lighting load, and the process proceeds to decrement the counter(s) (412) before ending until the next iteration. Eventually the cycle delay is expected to lapse in a subsequent iteration, and if the then-representative current ambient light level on that subsequent iteration remains below the turn-on threshold light level, inquiry 408 will be answered in the affirmative and the process will see the processing circuit control the switch to couple the supply of electrical power to the lighting load.

Returning to inquiry 404, if the light/dark state is dark, the process proceeds to FIG. 4B, at which point an inquiry (414) is made as to whether the predetermined amount of time has lapsed (e.g., was decremented to zero) on the last iteration of the process. In this regard, the dynamic sample time could be in one of three states—it either (i) is greater than zero and is in the process of decrementing to zero after having been previously reset when last switching ON the load, (ii) was decremented to zero on the last iteration of the process after having been previously reset when last switching ON the load, or (iii) decremented to zero prior to the last iteration of the process after having been previously reset when last switching ON the load. If the dynamic sample time lapsed on the last iteration of the process, then it is time to adjust the turn-off threshold, and this is done using the current ambient light level that was sensed on this iteration (at 402). In other words, the process on this iteration sensed the current ambient light level in the environment after lapse of the predetermined amount of time (after having last transitioned the switch to the ON state), and determined the representative current ambient light level using that sensed current ambient light level. The process adjusts (416) the turn-off threshold light level using the current ambient light level, and returns to FIG. 4A to decrement the counter(s) (412).

In some examples, the adjusting (416) sets the turn-off threshold light level to be higher than the current ambient light level, and therefore the ambient light level in the environment therefore must be brighter than that current ambient level before control the switch to decouple the supply of electrical power from the lighting load. In one example, the current ambient light level is used as the representative current ambient light level and the adjusting sets the turn-off threshold to be some function of, such as a percentage higher than, the current ambient light level. In another example, another light level is determined as function of the current ambient light level (for instance an average of the last n number of sensed ambient light levels, which includes the just-sensed current ambient light level), that another light level is taken as the representative current ambient light level, and the adjusting sets the turn-off threshold to be some function of, such as a percentage higher than, that representative current ambient light level. In either case, the adjusting uses the current ambient light level sensed on that iteration when adjusting the turn-off threshold, and uses some function of that current ambient light level in doing so.

As noted, in some examples the adjusting sets the turn-off threshold light level as a function of the representative current ambient light level. For instance, the function is a fixed amount or percentage (for instance 5%) above the representative current ambient light level.

The turn-off threshold prior to the adjustment at 416 may have been set/initialized to some initial threshold light level, for instance the same level to which the turn-on threshold was initialized or another level. The adjusting (416) in this case might raise the turn-off threshold light level from the initial threshold light level to an adjusted threshold light level.

Optionally, the process could determine whether the representative current ambient light level is higher than the turn-on threshold light level at that time. The adjusting (416) could be selectively performed only after determining that the representative current ambient light level, or some other level such as the level 5% higher than representative current ambient light level, is higher than the turn-on threshold light level or some minimum (or default) turn-off threshold. This could be used to enforce a requirement that the turn-off threshold always meet or exceed a default turn-off threshold, such as the turn-on threshold if also used as a default turn-off threshold.

Returning to 414, if the dynamic sample time did not just lapse on the last iteration (414, N) then the dynamic sample time either has not yet lapsed after transitioning the switch ON and resetting the dynamic sample time, or it had lapsed on a prior iteration and therefore the turn-off threshold had already been adjusted at 416 on a prior iteration. In either case, the process proceeds by determining (418) whether the representative current ambient light level, which again may be taken as the current ambient light level sensed at 402 or another level that is a function of the sensed current ambient light level, increased to the turn-off threshold light level. If not (418, N), the process proceeds back to FIG. 4A to decrement the counter(s) (412). Otherwise (418, Y), the process checks (420) whether the cycle delay has lapsed, and if not (420, N) proceeds back to FIG. 4A to decrement the counter(s) (412). If instead the cycle delay has lapsed (420, Y), the process at 422 proceeds with processing circuit transitioning the load OFF by controlling the switch to decouple the supply of electrical power from the lighting load, setting the light/dark state to 'light' to indicate the ambient condition as nighttime, and resetting the cycle delay time for commencing countdown again. At that point, the process proceeds back to FIG. 4A to decrement the counter(s) (412).

The decrement at 412 is the means by which times/timers are updated throughout the iterative processing. This is just one implementation; timers can be implemented in any of various ways. In this case, the cycle delay time and the predetermined amount of time (dynamic sample time) are each decremented by '1' on each iteration when greater than zero. The amount of 'time' that corresponds to each of these is therefore a function of how often the process iterates. In examples, the process of FIGS. 4A-4B iterates every minute.

Since the dynamic sample time is relevant only from the time the switch is switched ON until expiry/lapse of the dynamic sample time, it may not be necessary or desired to continue to decrement the dynamic sample time (below zero) and resume decrementing until it has been reset, which occurs each time the load is switched ON at 410. It is also noted that under this approach where the times are represented as counters/timers that are decremented at the conclusion of each iteration of the processing described, the values to which the cycle delay time and the dynamic sample are reset at 410, 422 and at 410, respectively, should be '1' greater than the desired cycle delay or dynamic sample time, as the case may be. For instance, if the dynamic sample time is desired to be '5' (corresponding to minutes in the example of FIGS. 4A, 4B), then resetting the dynamic sample time at 410 should set the dynamic sample time to 6, on account that the decrement at 412 will decrement the number to 5, and therefore lapse (if at all from that reset) on the 5th iteration thereafter.

In an alternative/additional embodiment, multiple units (e.g., systems, sensors, electrical load controllers, components, or the like) could cooperate to trigger the control of a switch of an electrical load controller based on an average light sensed to couple a supply of electrical power to a lighting load and/or decouple the supply of electrical power from the lighting load. In examples, averaging of ambient light readings captured, obtained, or determined by or between the units could be done. There could be communication (for instance, wired and/or wireless, possibly via connections to a cloud computing environment) between the units. It should be noted that any time a load affiliated with one unit is switched on, this could affect the overall average reading, and therefore potentially affect how the other units are to appropriate act (e.g., factor out the effects of involvement of multiple lighting loads that might contribute to the average reading used for switching).

In another alternative/additional embodiment, aspects could trigger switching (on and/or off) based on a rate of change of ambient light being sensed. The rate of change of the light level could vary substantially throughout the day due to any of varying conditions, including cloud coverage and other weather-related conditions, in addition to the normal sunrise and sunset transitions. In any case, these could potentially be accounted—for and used in determining thresholds, for example, to trigger switching. There could still be some predetermined threshold(s), delays, and/or timers so that the lighting loads are not turned on based on short-duration ambient changes (such as when a cloud passes over during the middle of the day when still fairly light outside). In addition, it is noted that various thresholds could be user-set and/or adjusted over time based on readings taken over time, for instance over multiple days as an example.

In yet another alternative/additional embodiment, aspects described could be applied not only to outdoor settings/environments but also indoor settings/environments to control a light in an interior space. The control could be based on changing ambient conditions either in that indoor or outdoor environment or in another environment. For example, an indoor lighting load could be controlled on and off based on ambient conditions in the indoor environment, an adjacent outdoor environment, or a combination of the two. Also, if control is to be based on just interior ambient conditions, processes can be configured to account for (i.e., factor-out) any contribution of ambient coming from an outdoor environment, such as light entering the interior space through a window or door of the interior space.

In another alternative/additional embodiment, an electrical load controller can obtain weather data and adjust operation accordingly. This could be useful as additional information to the controller and/or to provide a context for sensed ambient conditions, for example. For instance, if it is known that there will be a duration of heavy cloud cover in the middle of an otherwise sunny day, the controller could be configured to disregard the relatively low ambient light level readings that are expected to be sensed during the prior of cloud cover, with knowledge that such low ambient readings are expected to be temporary and therefore that the lighting load is not to be switched on during the day.

Although various examples are provided, variations are possible without departing from a spirit of the claimed aspects.

Figure 5:
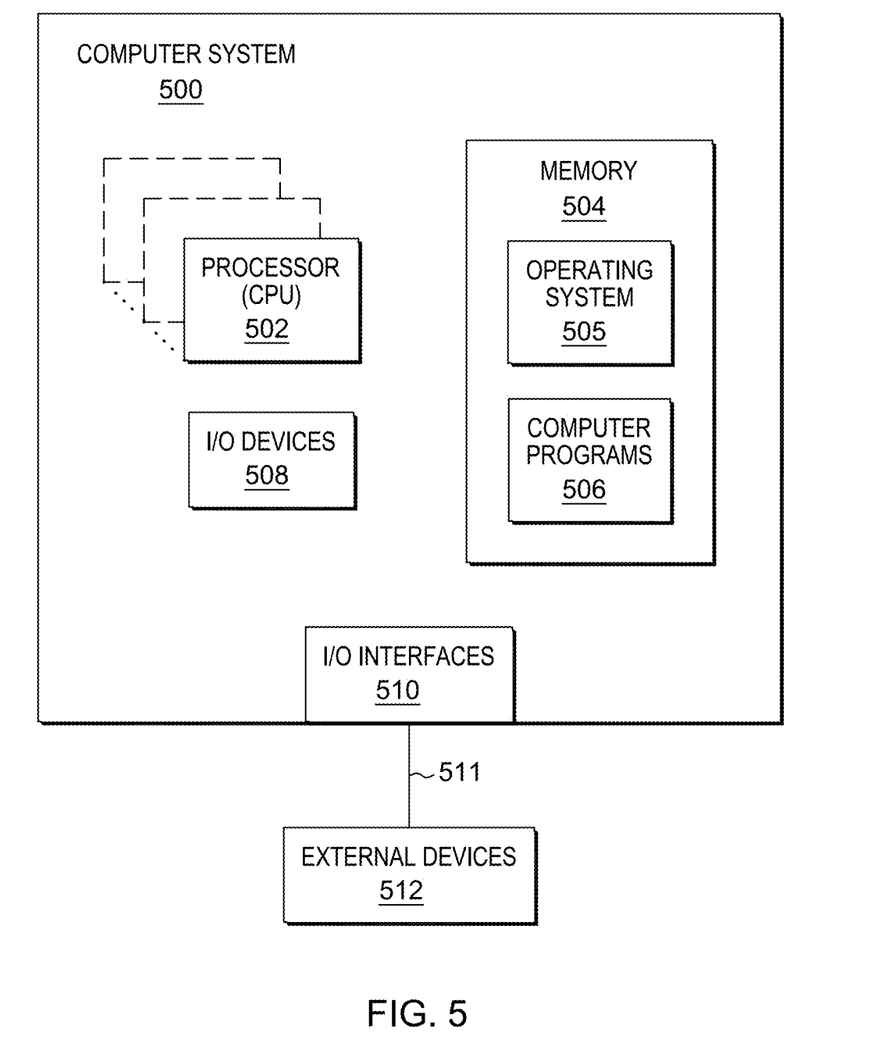
FIG. 5 depicts one example of a computer system and associated devices to incorporate and/or use aspects described herein.

Systems described herein, including those referred to herein as electrical load controllers, may be regarded in some respects as a computer system capable of executing program instructions to perform processes/methods. Thus, processes as described herein may be performed by one or more computer systems, such as those described herein, which may include one or more wall-box-installed switches and/or one or more computer systems of or connected thereto, such as one or more cloud servers, one or more embedded computers, and/or one or more other computer systems. FIG. 5 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light (for instance ambient light), proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer, or devices to/from which data is communicated with the computer system 500, including, for instance, sensors. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be a system, a method, and/or a computer program product, any of which may be configured to perform or facilitate aspects described herein.

In some embodiments, aspects may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C#, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects described herein, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. An electrical load controller for controlling conduction of a supply of electrical power to a lighting load in an environment, the electrical load controller comprising:
a line input terminal and a load output terminal, the line input terminal configured to be electrically coupled to the supply of electrical power, and the load output terminal configured to be electrically coupled to the lighting load;
a sensor configured to sense ambient light levels in the environment;
a switch electrically coupled in series between the line input terminal and the load output terminal, the switch being controllable to selectively couple the supply of electrical power to the lighting load and decouple the supply of electrical power from the lighting load; and
a processing circuit;
wherein based on an ambient light level in the environment decreasing to a turn-on threshold light level, the processing circuit is configured to control the switch to couple the supply of electrical power to the lighting load;
wherein the sensor is configured to sense a current ambient light level in the environment after a lapse of a predetermined amount of time subsequent to the processing circuit controlling the switch to couple the supply of electrical power to the lighting load; and
wherein the processing circuit is configured to adjust a turn-off threshold light level using the current ambient light level.

2. The electrical load controller of claim 1, wherein the processing circuit is configured to adjust the turn-off threshold light level by setting the turn-off threshold light level to be higher than the current ambient light level such that the ambient light level in the environment must be brighter than the current ambient level for the processing circuit to control the switch to couple the supply of electrical power to the lighting load.

3. The electrical load controller of claim 2, wherein the processing circuit is configured to adjust the turn-off threshold light level by setting the turn-off threshold light level as a function of the current ambient light level.

4. The electrical load controller of claim 3, wherein the function is a fixed percentage above the current ambient light level.

5. The electrical load controller of claim 3, wherein the function is a first function and is a fixed percentage above another light level determined as a second function of the current ambient light level.

6. The electrical load controller of claim 2, wherein the processing circuit is further configured to, based on determining that the turn-off threshold light level, as adjusted, is below a predetermined default turn-off threshold light level, set the turn-off threshold light level to the predetermined default turn-off threshold light level.

7. The electrical load controller of claim 1, wherein the processing circuit is further configured to, prior to adjusting the turn-off threshold light level using the current ambient light level, set the turn-off threshold light level to an initial threshold light level, wherein the processing circuit is configured to adjust the turn-off threshold light level by raising the turn off threshold light level from the initial threshold light level to an adjusted threshold light level.

8. The electrical load controller of claim 1, wherein the processing circuit is further configured to:
maintain a cycle delay time;
check whether the cycle delay time has lapsed, wherein the processing circuit is configured to control the switch to couple the supply of electrical power to the lighting load based on determining that the cycle delay time has lapsed; and
based on the control of the switch to couple the supply of electrical power to the lighting load, reset and commence countdown of the cycle delay time, and commence countdown of the predetermined amount of time.

9. The electrical load controller of claim 8, wherein the processing circuit is further configured to:
maintain a light/dark state indicating a current ambient condition of the environment as being either daytime or nighttime; and
based on the control of the switch to couple the supply of electrical power to the lighting load, set the light/dark state to indicate the ambient condition as nighttime.

10. The electrical load controller of claim 9, wherein the sensor is configured to iteratively or continually sense next current ambient light levels in the environment, and wherein the processing circuit is further configured to,
based on determining that (i) a next current ambient light level or (ii) another light level determined as a function of the next current ambient light level has increased to meet or exceed the turn-off threshold level, and based further on the cycle delay time having again lapsed:
control the switch to decouple the supply of electrical power from the lighting load;
set the light/dark state to indicate the ambient condition as daytime; and
reset and commence countdown of the cycle delay time.

11. The electrical load controller of claim 1, wherein the turn-on threshold level is a predetermined ambient light level.

12. The electrical load controller of claim 11, wherein the predetermined ambient light level is user-selected or is automatically determined based on analyzing changes in ambient light level in the environment as the environment transitions between daylight and nighttime ambient conditions.

13. A method for controlling conduction of a supply of electrical power to a lighting load in an environment, method comprising:
sensing an ambient light level in the environment decreasing to a turn-on threshold light level;
based on the sensing the ambient light level in the environment decreasing to the turn-on threshold light level, controlling a switch of an electrical load controller to couple the supply of electrical power to the lighting load, the switch being controllable to selectively couple the supply of electrical power to the lighting load and decouple the supply of electrical power from the lighting load;

sensing a current ambient light level in the environment after a lapse of a predetermined amount of time subsequent to the controlling the switch to couple the supply of electrical power to the lighting load; and adjusting a turn-off threshold light level using the current ambient light level.

14. The method of claim 13, wherein the adjusting sets the turn-off threshold light level to be higher than the current ambient light level such that the ambient light level in the environment must be brighter than the current ambient level to control the switch to couple the supply of electrical power to the lighting load.

15. The method of claim 14, wherein the adjusting sets the turn-off threshold light level as a function of the current ambient light level.

16. The method of claim 15, wherein the function is a fixed percentage above the current ambient light level.

17. The method of claim 15, wherein the function is a first function and is a fixed percentage above another light level determined as a second function of the current ambient light level.

18. The method of claim 14, further comprising, based on determining that the turn-off threshold light level, as adjusted by the adjusting, is below a predetermined default turn-off threshold light level, setting the turn-off threshold light level to the predetermined default turn-off threshold light level.

19. The method of claim 13, further comprising, prior to the adjusting, setting the turn-off threshold light level to an initial threshold light level, wherein the adjusting raises the turn off threshold light level from the initial threshold light level to an adjusted threshold light level.

20. The method of claim 13, further comprising:
maintaining a cycle delay time;
checking whether the cycle delay time has lapsed, wherein the controlling the switch of the electrical load controller to couple the supply of electrical power to the lighting load is performed based on determining that the cycle delay time has lapsed; and
based on the controlling the switch of the electrical load controller to couple the supply of electrical power to the lighting load, resetting and commencing countdown of the cycle delay time, and commencing countdown of the predetermined amount of time.

21. The method of claim 20, further comprising:
maintaining a light/dark state indicating a current ambient condition of the environment as being either daytime or nighttime; and
based on the controlling the switch of the electrical load controller to couple the supply of electrical power to the lighting load, setting the light/dark state to indicate the ambient condition as nighttime.

22. The method of claim 21, further comprising:
iteratively or continually sensing next current ambient light levels in the environment; and
based on determining that (i) a next current ambient light level or (ii) another light level determined as a function of the next current ambient light level has increased to meet or exceed the turn-off threshold level, and based further on the cycle delay time having again lapsed:
controlling the switch of the electrical load controller to decouple the supply of electrical power from the lighting load;
setting the light/dark state to indicate the ambient condition as daytime; and
resetting and commencing countdown of the cycle delay time.

23. The method of claim 13, wherein the turn-on threshold level is a predetermined ambient light level.

24. The method of claim 23, wherein the predetermined ambient light level is user-selected or is automatically determined based on analyzing changes in ambient light level in the environment as the environment transitions between daylight and nighttime ambient conditions.

25. An electrical load controller for controlling conduction of a supply of electrical power to a lighting load in an environment, the electrical load controller comprising:
a line input terminal and a load output terminal, the line input terminal configured to be electrically coupled to the supply of electrical power, and the load output terminal configured to be electrically coupled to the lighting load;
a sensor configured to sense ambient light levels in the environment;
a switch electrically coupled in series between the line input terminal and the load output terminal, the switch being controllable to selectively couple the supply of electrical power to the lighting load and decouple the supply of electrical power from the lighting load; and
a processing circuit;
wherein the processing circuit is configured to set a turn-off threshold light level based on lapse of a predetermined amount of time after controlling the switch to couple the supply of electrical power to the lighting load, the turn-off threshold light level being a threshold at which the processing circuit is configured to control the switch to decouple the supply of electrical power from the lighting load.

* * * * *